United States Patent [19]

Sato

[11] Patent Number: 5,095,436
[45] Date of Patent: Mar. 10, 1992

[54] METHOD FOR CONTROLLING BRAKING OF DRIVING WHEELS OF A VEHICLE

[75] Inventor: Makoto Sato, Wako, Japan

[73] Assignee: Honda Giken Kogyo Kabushiki Kaisha, Tokyo, Japan

[21] Appl. No.: 371,131

[22] Filed: Jun. 26, 1989

[30] Foreign Application Priority Data

Jun. 27, 1988 [JP] Japan .................................. 63-158326

[51] Int. Cl.$^5$ ................................................. B60T 7/12
[52] U.S. Cl. .............................. 364/426.03; 180/197; 303/95
[58] Field of Search ....................... 364/426.02, 426.03; 303/94–96, 98; 180/197

[56] References Cited

U.S. PATENT DOCUMENTS

| | | | |
|---|---|---|---|
| 4,480,309 | 10/1984 | Burokhardt et al. | 364/426.03 |
| 4,521,856 | 6/1985 | Phelps et al. | 364/426.03 |
| 4,739,856 | 4/1988 | Inagaki et al. | 364/426.03 |
| 4,825,367 | 4/1989 | Nagaoka et al. | 364/424.01 |

FOREIGN PATENT DOCUMENTS

| | | |
|---|---|---|
| 221299 | 5/1987 | European Pat. Off. . |
| 251156 | 1/1988 | European Pat. Off. . |
| 2911372 | 10/1980 | Fed. Rep. of Germany . |
| 2192034 | 12/1987 | United Kingdom . |

Primary Examiner—Thomas G. Black
Attorney, Agent, or Firm—Armstrong, Nikaido, Marmelstein, Kubovcik & Murray

[57] ABSTRACT

A method of controlling the braking of a driving wheel of a vehicle, for braking driving wheel brakes in response to an occurrence of slipping of the driving wheels, includes the steps of applying a predetermined braking force from the brakes to the driving wheels in response to a manual operation before the starting of movement of the vehicle, gradually reducing the braking force of the brakes in response to the starting movement of the vehicle before the slip of the driving wheels is detected.

3 Claims, 3 Drawing Sheets

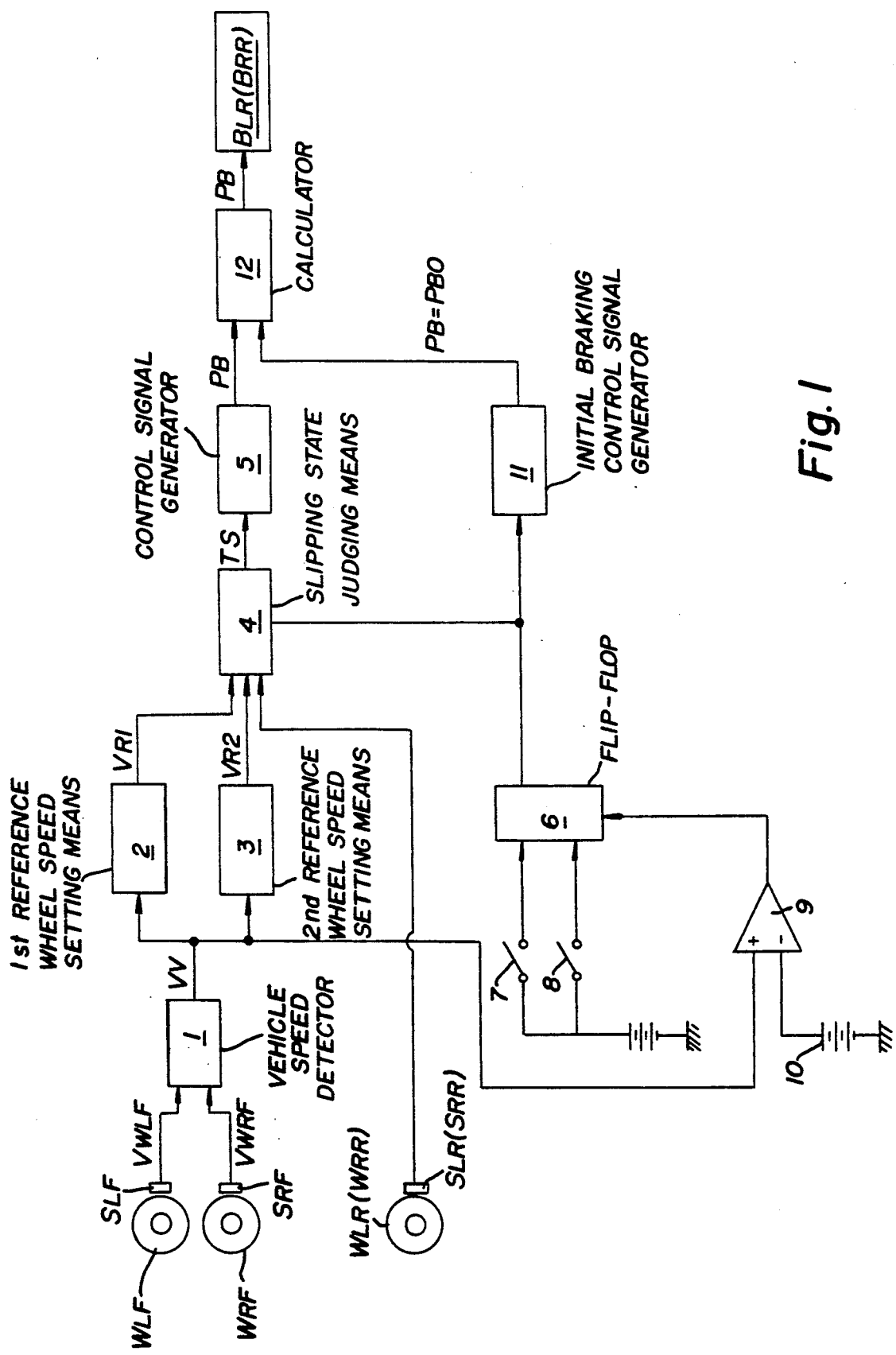

METHOD FOR CONTROLLING BRAKING OF DRIVING WHEELS OF A VEHICLE

BACKGROUND OF THE INVENTION

The present invention relates to a method for controlling the braking of drive wheels of a vehicle in order to brake the drive wheels in response to the occurrence of slipping of the drive wheels.

DESCRIPTION OF THE PRIOR ART

A method for braking drive wheels when excessively slipping is illustrated in U.S. Pat. No. 3,893,535. In this method, when the driving wheels are detected to be excessively slipping based upon the relationship between a driven wheel speed and a driving wheel speed, then the braking is controlled.

However, a driven wheel speed is zero when a vehicle starts. When power is supplied directly to driving wheels on a road surface having an extremely low frictional coefficient, an excessive slip is immediately generated due to the amount of drive torque supplied to the wheels. Therefore, it is difficult to suppress the excessive slip generated already even if the above-mentioned conventional braking control is performed.

SUMMARY OF THE INVENTION

It is therefore an object of the present invention to provide a method for controlling the braking of driving wheels of a vehicle which can eliminate the difficulty of the conventional method and which can suppress the drive torque of driving wheels by applying a predetermined braking force to the driving wheels at the initial time of starting up, by means of the driver's manual operation and for gradually generating the drive torque after beginning to smoothly start the vehicle.

Accordingly to the method of the present invention, a predetermined braking force is applied by a braking means in response to a manual operation of the driver before the vehicle stargs, and the braking force of the braking means is gradually reduced in response to the starting operation of the vehicle before the slip of the drive wheels is detected.

According to the method described above, when a driver determines that it will be difficult to smoothly start the vehicle due to the low frictional coefficient of a road surface, the braking means applies a predetermined braking force in response to the driver's manual operation. Therefore, the drive torque is suppressed at the initial time of starting the vehicle, and the occurrence of excessive slip of the drive wheels is accordingly suppressed. Further, since the braking force is gradually reduced in response to the starting operation, the drive torque can be gradually increased to smoothly start the movement of the vehicle.

BRIEF DESCRIPTION OF THE DRAWINGS

The above and other objects, features and advantages of the invention will become apparent from the following description taken in conjunction with the accompanying drawings, in which:

FIGS. 1 to 4 illustrate an embodiment of the present invention;

FIG. 1 is a block diagram illustrating the entire arrangement of the embodiment;

FIG. 2 is a graph illustrating the output characteristics of the reference wheel speed setting means;

FIG. 3 is a graph illustrating the output characteristics of the reference wheel speed setting means;

FIG. 4 is a timing chart illustrating the operation of the embodiment.

DESCRIPTION OF THE PREFERRED EMBODIMENTS

The present invention will now be described by way of embodiments applied to a rear-wheel drive wheel vehicle with reference to the accompanying drawings. Referring first to FIG. 1, when an excessive slip occurs at the drive wheels of a rear-wheel drive vehicle, i.e., left and right rear wheels $W_{LR}$ and $W_{RR}$, braking means $B_{LR}$ and $B_{RR}$ respectively attached to the rear wheels $W_{LR}$ and $W_{RR}$ operate to brake the rear wheels to avoid the excessive slipping.

The circuit arrangement for controlling the braking means $B_{LR}$ attached to the left rear wheel $W_{LR}$ is fundamentally the same as that for controlling the braking means $B_{RR}$ attached to the right rear wheel $W_{RR}$, and only the circuit arrangement for controlling the braking means $B_{LR}$ attached to the left rear wheel $W_{LR}$ will be described in detail.

Speed sensors $S_{LF}$ and $S_{RF}$ are respectively attached to left and right front wheels $W_{LF}$ and $W_{RF}$ as driven wheels, and driven wheel speeds $V_{WLF}$ and $V_{WRP}$ respectively produced from the speed sensors $S_{LF}$ and $S_{RF}$ are input to a vehicle speed detector 1. Vehicle speed detector 1 averages both the driven wheel speeds $V_{WLF}$ and $V_{WRF}$ to produce a vehicle speed $V_V$. Vehicle speed $V_V$ detected by the vehicle speed detector 1 is input to first reference wheel speed setting means 2 and second reference wheel speed setting means 3.

Figure 2:
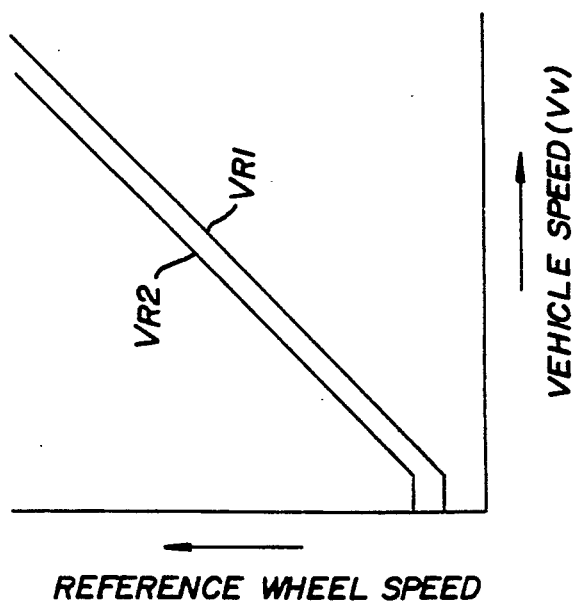

The first reference wheel speed setting means 2 and the second reference wheel speed setting means 3 respectively determine a first reference wheel speed $V_{R1}$ and a second reference wheel speed $V_{R2}$ in response to the vehicle speed $V_V$, as shown in FIG. 2, and then output the respective reference wheel speed $V_{R1}$ and $V_{R2}$. Here, the first reference wheel speed $V_{R1}$ is determined in response to an allowable slip ratio, and the second reference wheel speed $V_{R2}$ is set to a value larger than the first reference wheel speed $V_{R1}$ and represents the state in which an excessive slip occurs.

The reference wheel speeds $V_{R1}$ and $V_{R2}$, respectively, output from the first and second reference wheel speed setting means 2 and 3 are then input to the slipping state judging means 4. On the other hand, the speed sensor $S_{LR}$ is attached to the left rear wheel $W_{LR}$, and the left driving wheel speed $V_{WLR}$ produced from the speed sensor $S_{LR}$ is input to the slipping state judging means 4.

The slipping state judging means 4 produces a determined value TS of the slipping state by the following equation.

$$TS = (V_{WLR} - V_{R1})/(V_{R2} - V_{R1})$$

Figure 3:
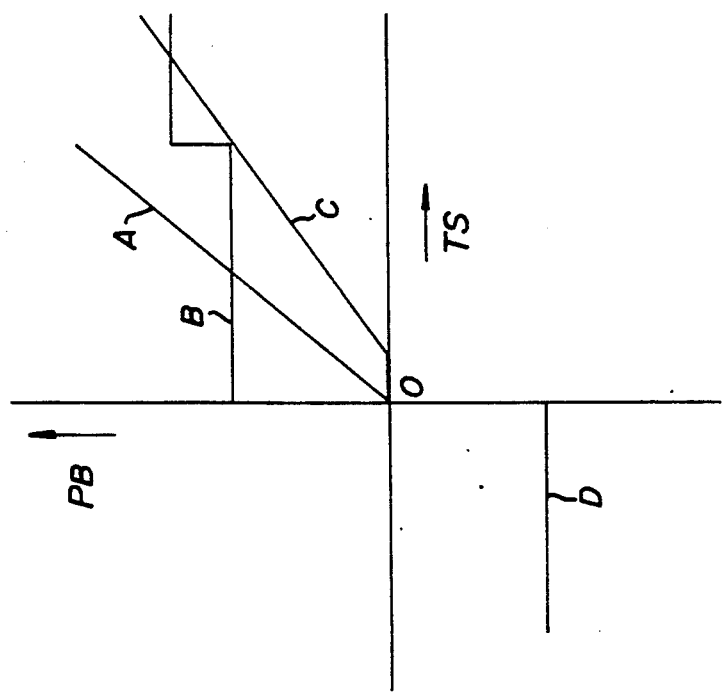

This determined value TS is input to control signal generating means 5. The control signal generating means 5 outputs a control signal based upon the determined value TS, i.e., an increasing speed $\dot{p}_B$ of the braking pressure in the braking means $B_{LR}$. Here, in case of $TS > 0$, the increasing $\dot{p}_B$ of the braking pressure may be set arbitrarily as shown by A, B, and C in FIG. 3, but in case of $TS \leq 0$, i.e., when the drive wheels are not slipping, it is set to a negative predetermined value as shown by D in FIG. 3.

The slipping state judging means 4 forcibly outputs the determined value TS as being "0" (TS=0) when the output of a flip-flop 6 is a high level. The increasing speed $p_B$ generated from the control signal generating means 5 also becomes "0" at this time. A manually operable switch 7 connects by the set input terminal of the flip-flop 6 to a high-level power source by the switching operation of the driver of the vehicle, and the flip-flop 6 is set such that its output signal is a high level in response to the manual operation (or closing) of the switch 7. A switch 8 which is opened and closed in response to the starting operation, such as the depression of an accelerator pedal by the driver, is connected to the reset input terminal of the flip-flop 6. Flip-flop 6 is thus reset in response to the closing of the switch 8. Further, a comparator 9 is connected to flip-flop 6, and when the output of the comparator 9 is at a low level, the setting of flip-flop 6 is inhibited.

A signal voltage corresponding to a vehicle speed $V_V$ is input from the vehicle speed detector 1 to the non-inverting input terminal of comparator 9, and a reference voltage corresponding to a reference vehicle speed $V_0$, such as 4 kph is input from a reference power supply 10 to the inverting input terminal of comparator 9. Thus, the comparator 9 outputs a low level when the vehicle speed $V_V$ is in a low speed state lower than the reference vehicle speed $V_0$. The flip-flop 6 is thus prevented from being set in this state.

The output terminal of the flip-flop 6 is connected to initial braking control signal generating means 11 together with the slipping state judging means 4. The initial braking control signal generating means 11 outputs a signal for setting a braking pressure $P_B$ in the braking means $B_{LR}$ to a predetermined braking pressure $P_{BO}$ as an initial braking control signal in response to the high level of the output of the flip-flop 6.

The outputs of the control signal generating means 5 and the initial braking control signal generating means 11 are both input to calculator 12. Calculator 12 calculates the value $P_B$, for example, according to the following equation, and outputs the control signal $P_B$ at each time of a TDC signal for controlling the braking means $B_{LR}$:

$$P_B = P_B + \overset{\bullet}{p_B}$$

The value $P_B$ in the right-hand side of the above equation is obtained from the previous calculation, and a new $P_B$ is produced by adding the $\overset{\bullet}{p_B}$ to the previous $P_B$.

Figure 4:
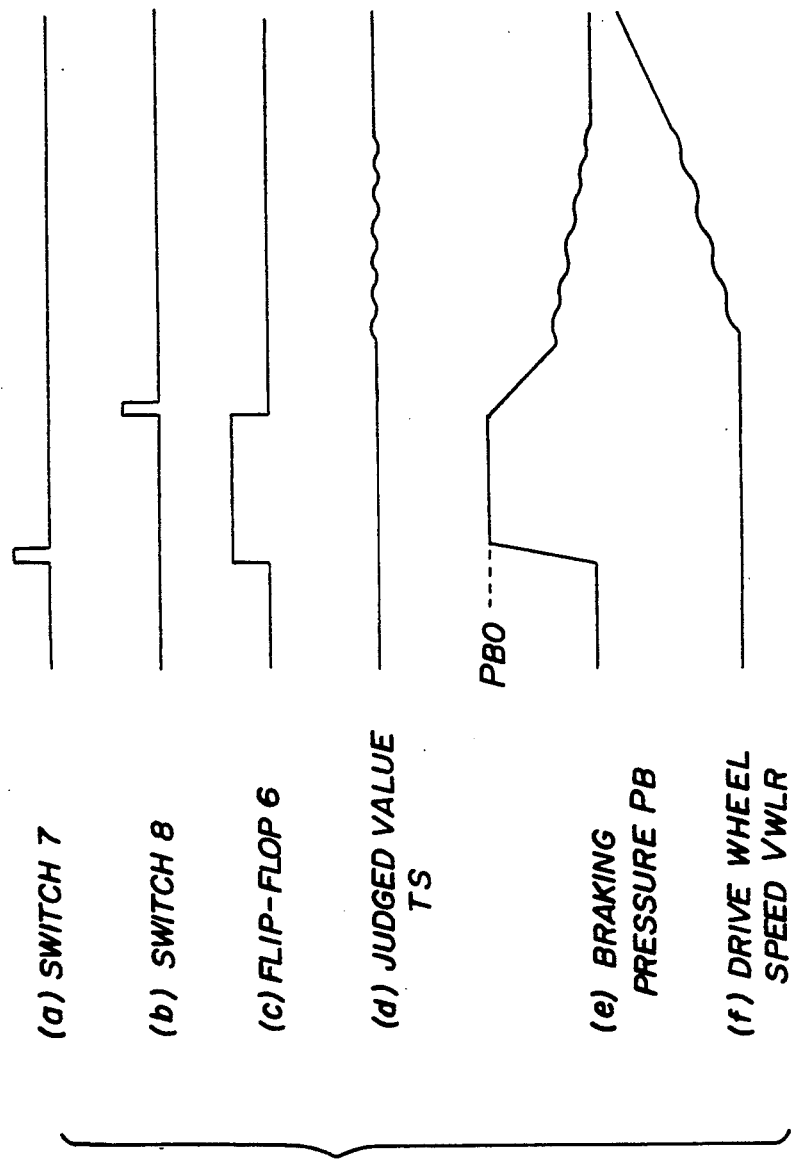

The operation of the embodiment will be described with reference to FIG. 4. When the driver determines that the frictional coefficient of the road surface is extremely low and it would be difficult to start the vehicle, the driver manually operates (closes) switch 7 as shown in FIG. 4(a). Then, the output of the flip-flop 6 becomes a high level as shown in FIG. 4(c), and the determined value TS of the slipping state judging means 4 becomes "0" in response to the high level of the output of the flip-flop 6 as shown in FIG. 4(d), and the output of the calculator 12 becomes $P_{80}$, a constant as shown in FIG. 4(e) by the input from the initial braking control signal generating means 11. Therefore, the braking means $B_{LR}$ applies a predetermined braking force, thereby suppressing the drive torque of the drive wheel $W_{LR}$.

When the driver starts the vehicle in such a state, the switch 8 is conducted as shown in FIG. 4(b), and the flip-flop 6 is reset in response to the closing of switch 8. Thus, the value $P_B$ produced by newly adding the increasing speed $p_B$ from the slipping state judging means 4 to the initial braking pressure $P_{80}$ is output from the calculator 12 as the control signal of the braking means $B_{LR}$. Since TS=0 is satisfied in this state, the increasing speed $P_B$ is negative, and the output of the calculator 12 is gradually reduced as shown in FIG. 4(e). Thus, the drive wheel speed $V_{WLR}$ is gradually increased as shown in FIG. 4(f), thereby smoothly starting the vehicle.

If an excessive slip occurs during the starting operation, the excessive slip is controlled in accordance with the determined value TS.

In the embodiment described above, the starting operation of the vehicle is detected by the depression of the accelerator pedal. However, the present invention is not limited to the particular embodiment described above. For example, the starting operation of the vehicle can be also detected by the connecting state or the connection starting state of a starting clutch when the gear train of a transmission is established, or an increase in a vehicle speed from 0 km/hr. may be detected as the starting state.

According to the present invention as described above, the predetermined braking force is performed by the braking means in response to the manual operation before the vehicle is started, and the braking force of the braking means is gradually reduced in response to the starting operation of the vehicle before the slip of the drive wheels is detected. Therefore, when the frictional coefficient of a road surface is extremely low and the starting of the vehicle is predicted to be very difficult, a predetermined braking force is applied to the drive wheels in response to the driver's manual operation in order to suppress the occurrence of the excessive slip, and the braking force is gradually decreased in response to the starting operation to effectively suppress the occurrence of the excessive slip, thereby smoothly starting the vehicle.

I claim:

1. A method of controlling the braking of a driving wheel of a vehicle, for actuating a driving wheel braking means to prevent an occurrence of slipping of the driving wheels, said method comprising the steps of:
   applying a predetermined braking force from the braking means to the driving wheels in response to a manual operation before initial movement of the vehicle; and
   gradually reducing the braking force of the braking means in response to the initial movement of the vehicle before the slip of the driving wheels is detected.

2. The method of controlling the braking of a driving wheel of a vehicle of claim 1, further comprising:
   detecting a slipping condition of the driving wheel and outputting a slipping condition thereof;
   increasing the braking force of the braking means in response to the slipping condition.

3. The method of controlling the braking of a driving wheel of a vehicle of claim 1, further comprising:
   detecting the initial movement of the vehicle by detecting depression of an accelerator pedal.

* * * * *